United States Patent [19]
Wilbert

[11] Patent Number: 5,694,732
[45] Date of Patent: Dec. 9, 1997

[54] METHOD AND APPARATUS FOR CONSTRUCTION

[75] Inventor: Wolf Wilbert, Edmonton, Canada

[73] Assignee: Wolf Creative Design Ltd., Edmonton, Canada

[21] Appl. No.: 748,528

[22] Filed: Nov. 13, 1996

Related U.S. Application Data

[63] Continuation of Ser. No. 163,500, Dec. 6, 1993.
[51] Int. Cl.[6] ............................... F04B 1/38; F16B 7/08
[52] U.S. Cl. ........................... 52/698; 52/702; 52/712; 52/636; 403/403; 403/400; 403/232.1; 248/248
[58] Field of Search ........................... 52/696, 698, 702, 52/703, 712, 633, 634, 636, 639; 403/232.1, 400, 401, 399, 403, 191; 248/247, 248

[56] References Cited

U.S. PATENT DOCUMENTS

| | | | |
|---|---|---|---|
| 1,765,107 | 6/1930 | Snyder | 248/248 X |
| 2,376,966 | 5/1945 | Irgerman | 248/248 |
| 2,403,580 | 7/1946 | Cartwright et al. | 52/765 X |
| 2,902,714 | 9/1959 | Patterson et al. | 248/248 X |
| 3,193,885 | 7/1965 | Gartner et al. | 52/36.6 |
| 3,328,056 | 6/1967 | Heiken . | |
| 3,669,480 | 6/1972 | Fugate | 403/400 |
| 3,845,604 | 11/1974 | Ottosson . | |
| 4,030,846 | 6/1977 | Flototto . | |
| 4,032,242 | 6/1977 | Morris | 403/403 |
| 4,102,587 | 7/1978 | Herb et al. | 403/191 |
| 4,349,996 | 9/1982 | Lautersleger et al. | 52/643 |
| 4,452,027 | 6/1984 | Desai | 52/712 |
| 4,484,430 | 11/1984 | Rossman . | |
| 4,523,412 | 6/1985 | Sielaff . | |
| 4,572,695 | 2/1986 | Gilb | 403/403 |
| 4,594,017 | 6/1986 | Hills . | |
| 4,981,388 | 1/1991 | Becken et al. | |

FOREIGN PATENT DOCUMENTS

| | | | |
|---|---|---|---|
| 0182520 | 7/1955 | Austria | 403/432.1 |
| 2364415 | 7/1975 | Germany . | |
| 2-35142 | 5/1990 | Japan . | |

*Primary Examiner*—Carl D. Friedman
*Assistant Examiner*—Winnie Yip
*Attorney, Agent, or Firm*—Pearne, Gordon, McCoy & Granger LLP

[57] ABSTRACT

In a method of post beam construction, a horizontal beam member is connected to a post member by means of a connector element interposed between the two. The connector includes an upper plate member and a lower plate member, bridged by an apertured central member that is offset from the plate members and forms a recess between same. The method includes the steps of:

i) securing the connector to a post by fastening the upper and lower plates thereof to same;

ii) profiling a beam by forming a channel therein dimensioned to accommodate said central member of the connector element whereby the beam will fit onto a connector element;

iii) boring a first, longitudinal, hole in the beam aligned with the aperture in the central member;

iv) boring a second, transverse hole in the beam, intersecting the first hole, and inserting an internally threaded connector therein;

v) inserting an externally threaded connector in the first hole, into threaded connection with said internally threaded connector, whereby said externally threaded connector extends from said beam in the area of said channel, to a point not beyond the end of the beam;

vi) fitting the beam on said connecting element, with the externally threaded connector extending through the aperture in said central member; and vii) threading a nut onto the externally threaded connector, in said recess, and tightening the nut, thereby to fasten said beam to said post.

12 Claims, 1 Drawing Sheet

METHOD AND APPARATUS FOR CONSTRUCTION

This is a continuation of application Ser. No. 08/163,500 filed Dec. 6, 1993.

FIELD OF THE INVENTION

The present invention relates to the field of construction and provides an improved method for the erection of buildings and structures.

DESCRIPTION OF RELATED ART

It is generally the practice, when mounting a beam or joist to a post for vertical support thereof, to utilize either a joist hanger or to nail the beam to the top surface of the post. Alternatively, a joint may be cut in the post and the beam inserted therein. Specially made joints, however, require a great deal of skilled labour to execute properly, and do not provide a structure which can be easily disassembled if desired. Similarly, other known methods of post-beam connection are designed for permanent structures.

The object of the present invention is to provide a reliable means of post-beam connection which can be quickly assembled by relatively unskilled labour, and similarly disassembled easily. The present invention is intended for use in the construction of either permanent, or temporary structures. The method of the present invention is such that as may easily be learned and practised by non-specialized labour. Examples of proposed applications of the present invention are for prefabricated and modular structures, such as those utilized in construction in remote areas where one might desire to build an oil and gas exploration camp or a military installation.

The method of the present invention, as will be described in detail below, utilizes some of the hardware described and claimed in applicant's co-pending Canadian Patent Application No. 2,010,740, together with techniques and further hardware developed subsequent to the filing of that application.

In particular, subsequent to the original development of the hardware described in the aforementioned patent application, the whole of which is incorporated by reference, certain refinements in techniques for exploiting that invention have been developed by the applicant. These relate to, principally, the following improvement and developments:

i) novel hardware for connection of inclined beams/trusses to vertical posts;

ii) improved fastening means for the connection of posts to beams; and iii) improved methods of construction.

SUMMARY OF THE INVENTION

In a broad aspect, therefore, the present invention relates to a method of post beam construction in which a horizontal beam member is connected to a post member by means of a connector element interposed between the two, said connector including an upper plate member and a lower plate member, bridged by an apertured central member that is offset from the plate members and forms a recess between same, said method including the steps of: (i) securing said connector to a said post by fastening the upper and lower plates thereof to a said post; (ii) profiling a beam by forming a channel therein dimensioned to accommodate said central member of said connector element whereby said beam will fit onto a said connector element; (iii) boring a first, longitudinal, hole in said beam aligned with the aperture in said central member; (iv) boring a second, transverse hole in said beam, intersecting said first hole, and inserting an internally threaded connector therein; (v) inserting an externally threaded connector in said first hole, into threaded connection with said internally threaded connector, whereby said externally threaded connector extends from said beam in the area of said channel, to a point not beyond the end of said beam; (vi) fitting said beam on said connecting element, with said externally threaded connector extending through the aperture in said central member; and (vii) threading a nut onto said externally threaded connector, in said recess, and tightening said nut, thereby to fasten said beam to said post.

In another broad aspect, the present invention relates to a connector element for connecting a beam to a post, including an upper plate, a lower plate, and an apertured central element offset from said plates and connecting same, said upper and lower plates each being apertured for nut and bolt connection, to a beam, said upper and lower plates being congruent, and the apertures in said upper and lower plates being asymmetrically disposed relative to the central horizontal axis of said element, whereby said element may be inverted, and two said elements bolted to a beam on faces thereof disposed at right angles to one another at the same height, with no interference caused by the bolts holding one element, with the bolts holding the other element.

BRIEF DESCRIPTION OF THE DRAWINGS

In drawings that illustrate the present invention by way of example.

DESCRIPTION OF THE PREFERRED EMBODIMENTS

Figures 2, 3:
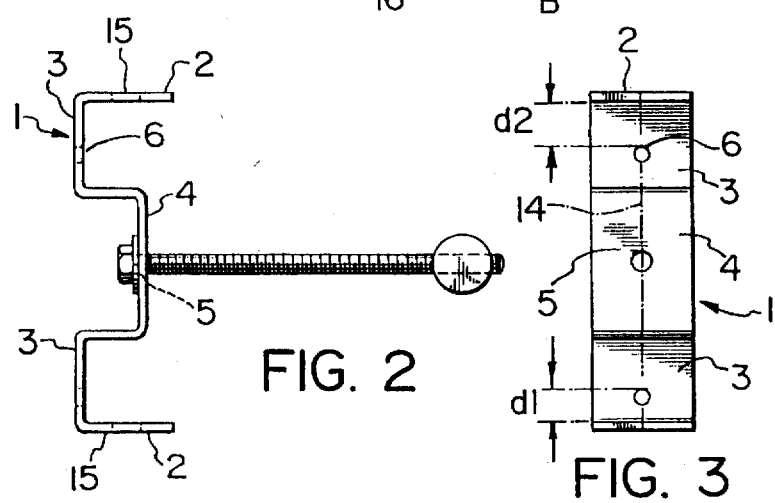
FIG. 2 is a side view of a standard post beam connector according to the present invention.
FIG. 3 is a front view of the connector of FIG. 2.
Figures 4, 5:
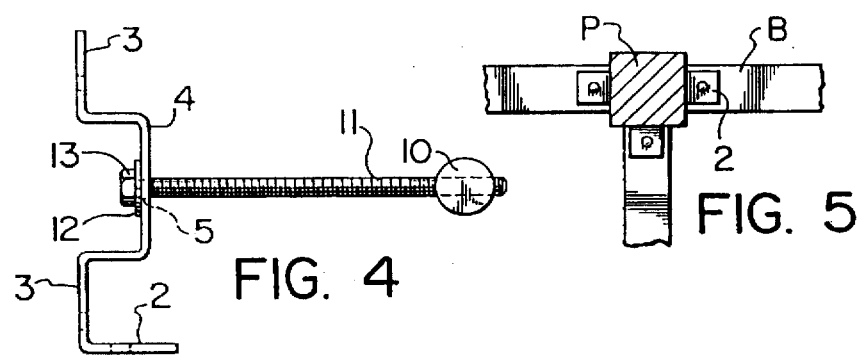
FIG. 4 is a side view of a gable beam connector according to the present invention.
FIG. 5 is a top view of a three-sided post beam connection according to the present invention.
Figures 6A, 6B, 7A, 7B:
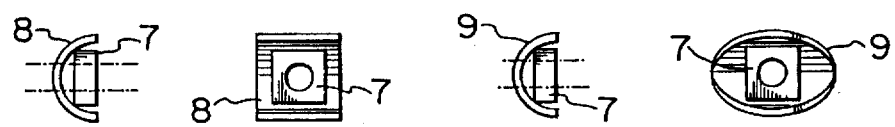
FIGS. 6a and 6b; and 7a and 7b are side views and rear views respectively of two tie nuts according to the present invention.

Referring now to the drawings, FIGS. 2 and 4 illustrate different views of the basic improved post/beam connector unit of the invention. The connector 1 is configured to engage the end of a beam (B), for instance a laminated spruce beam, that has had a channel cut in it to accommodate the central portion 4 of the connector 1. The connector comprises upper and lower plate portions 3 that are bridged together by recessed central portion 4. Central portion 4 is apertured, preferably at its centre 5 to accommodate a threaded bolt 11, the connection with which will be described in detail below. Extending from upper and lower portions 3, in the direction of the central portion 4, are support flanges 2.

Figure 1:
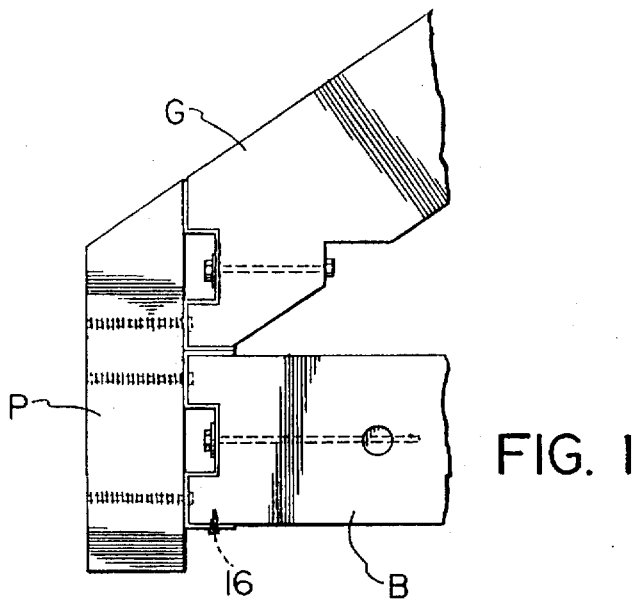
FIG. 1 is a side view of a gable and ceiling beam joint according to the present invention.

Upper and lower portions 3 are apertured, along their central longitudinal axis 14 with apertures 6. It will be observed especially from FIG. 3 that apertures 6 are not symmetrically placed. In particular, the distance d1 from the inner edge (relative to central portion 4) of an aperture 6 to flange 2 will necessarily be less than the distance d2 from the outer edge of the other aperture 6 to the flange 2. The reason for this is explained by reference to FIG. 5, where it is shown that in many applications of the present invention, it will be desired to join two beams to a post at right angles. This is done by passing bolts through apertures 6 through a beam B, and then into a nut that is either seated against a washer in a recess (see FIG. 1) or into a nut seated in a portion 3 of an opposing connector 1 of the other side of a beam. It will be observed that if apertures 6 were symmetrically deposed then connectors at right angles would be impossible, since the bolts holding them to a post would have to pass through one another. This problem is solved by the applicant by the configuration shown in FIG. 3, which permits connections at right angles to one another by the expedient of inverting one. If one is inverted, then since d1<d2, the bolts holding the two connectors to a post will not interfere with one another.

A specially designed connector for connection of a gable beam G (see FIG. 1) to a post P is shown in FIG. 4. The difference between such a connector and a standard connector, is the absence of a top flange 2, in view of the upwardly inclined top surface of a gable beam. It will be noted, in this regard, that a gable beam connector is not required to be invertible.

In assembly of a beam or gable to a post according to the present invention, the connectors 1 are first bolted to a post in the appropriate locations, as noted, with connectors that are on the same post at right angles to one another being inverted relative to one another. Recesses configured to fit around the central portions 4 of the connectors are then cut (or may be precut) in beams to be connected to the posts. Longitudinal holes are bored into the beams to align with centre holes 5 in the connectors. Transverse bore holes are then drilled through the beam to intersect with the longitudinal holes that have been drilled to the beams. Into each transverse hole is inserted a tie nut that may be either a cylindrical pipe or solid steel bolt 10 that is tapped to accept a threaded bolt, or as shown in FIGS. 6a, 6b, 7a and 7b, specially fabricated tie nuts. The tie nuts illustrated in FIGS. 6a and 6b each comprise a square nut 7 that is nested in a semi-cylindrically bent square washer 8. It is held there either by adhesive, or by a spot weld. In 7a and 7b, a similar tie nut is shown, but utilizing a semi-cylindrically bent round washer. A headless threaded bolt 11 is then threaded into the tie nut.

The assembly of beam plus threaded bolt 11 (headless) held in place by a tie nut may then be fitted onto a connector that is in place on a post, with the bolt 11 extending through central aperture 5. All that is then required for secure fastening of the beam to the post is placement of a washer 12 on the bolt 11, and threading and tightening of a nut 13 on threaded bolt 11. Finally, wood screws 16 may be drilled in through apertures 15 on flanges 2.

Connection of a gable G to a post is similar, but a transverse hole is not drilled in the gable, because of its incline. Rather, a notch is cut in it, with a surface parallel to the end of the gable beam that has been channelled to fit with central portion of the connector. An ordinary nut and washer may then be used in place of a specially designed tie nut.

It is to be understood that the examples described above are not meant to limit the scope of the present invention. It is expected that numerous variants will be obvious to the person skilled in the field of construction element design without any departure from the spirit of the invention. The appended claims, properly construed, form the only limitation upon the scope of the invention.

I claim:

1. A connector element to connect a beam to a post, said connector element comprising an upper plate, a lower plate, and a central plate between said upper and lower plates and connected to said upper and lower plates by a spaced pair of connecting plates; said central plate having a center and having an aperture for nut and bolt connection to the beam, said central plate defining a first plane, said connector element having a central axis passing through said center of said central plate and perpendicularly to said first plane, said upper and lower plates each having an aperture for nut and bolt connection to the post, said upper and lower plates being coplanar and defining a second plane and being substantially identical in plan, said first plane being substantially parallel to said second plane, said connector element being free from portions extending through or from said second plane in a direction away from said central plate, said central plate having a width defined by a first side edge and a second side edge, each of said first and second side edges extending between said connecting plates, said first side edge defining a third plane which is perpendicular with said first plane and which is parallel with said central axis, said second side edge defining a fourth plane which is perpendicular with said first plane and which is parallel with said central axis, each of said upper and lower plates extending substantially between said third and fourth planes, the apertures in said upper and lower plates being asymmetrically disposed relative to said central axis, whereby said connector element may be inverted, said connector element being capable of being combined with a second such connector element such that said two connector elements are capable of being bolted to a post on faces thereof disposed at right angles to one another at a similar level on said post, with no interference caused by the bolts holding the one connector element, with the bolts holding the other connector element.

2. A connector element according to claim 1, wherein said central plate has an aperture at its center.

3. A connector element according to claim 1, each of said upper and lower plates having an end most distant from said central plate, said connector element further including a first support flange extending from one of said most distant ends in the direction of said central plate and generally perpendicular to the upper or lower plate from which said first support flange extends.

4. A connector element according to claim 3, said first support flange having an aperture sized for receiving a screw.

5. A connector element according to claim 4, wherein a second support flange extends from the other of said most distant ends in the direction of said central plate and generally perpendicular to the upper or lower plate from which said second support flange extends.

6. A connector element according to claim 4, said connector element consisting essentially of said upper plate, said lower plate, said central plate connected to said upper and lower plates by said spaced pair of connecting plates, and said first support flange.

7. A connector element according to claim 5, said second support flange having an aperture sized for receiving a screw.

8. A connector element according to claim 7, said connector element consisting essentially of said upper plate, said lower plate, said central plate connected to said upper and lower plates by said spaced pair of connecting plates, said first support flange, and said second support flange.

9. A connector element according to claim 8, each of said upper plate, said lower plate, said central plate, said connecting plates, said first support flange, and said second support flange having a width, each of said widths being substantially the same as said width of said central plate.

10. A connector element according to claim 7 each of said upper plate, said lower plate, said connecting plates, said first support flange, and said second support flange having a width, each of said widths)being substantially the same as said width of said central plate.

11. A connector element according to claim 1, each of said upper and lower plates having a width, each of said widths being substantially as said width of said central plate.

12. A connector element according to claim 1, said connector element consisting essentially of said upper plate, said lower plate, and said central plate connected to said upper and lower plates by said spaced pair of connecting plates.

\* \* \* \* \*

UNITED STATES PATENT AND TRADEMARK OFFICE
CERTIFICATE OF CORRECTION

PATENT NO. : 5,694,732
DATED      : December 9, 1997
INVENTOR(S) : Wolf Wilbert

It is certified that error appears in the above-indentified patent and that said Letters Patent is hereby corrected as shown below:

Column 2, line 51, delete "(B)".

Column 4, line 64, delete "said central plate,".

Column 5, line 4, delete "widths)being" and insert therefore --widths being--.

Column 5, line 8, after "substantially" insert --the same--.

Signed and Sealed this

Twenty-fourth Day of February, 1998

Attest:

BRUCE LEHMAN

*Attesting Officer*        *Commissioner of Patents and Trademarks*